May 18, 1965 D. H. KAPLAN 3,184,181
CONVERTIPLANE WITH CONTROL MECHANISM
Filed July 8, 1959 5 Sheets-Sheet 4
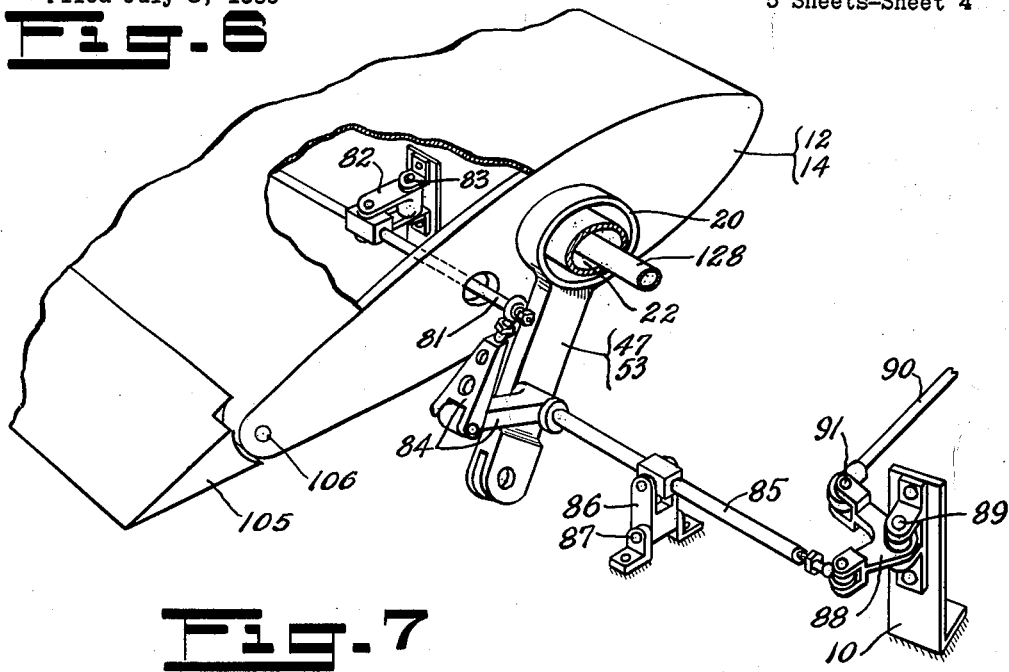
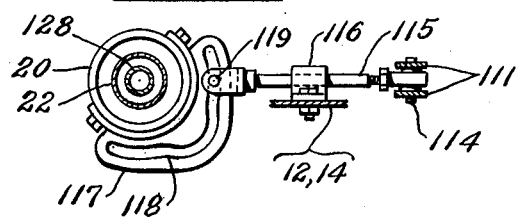
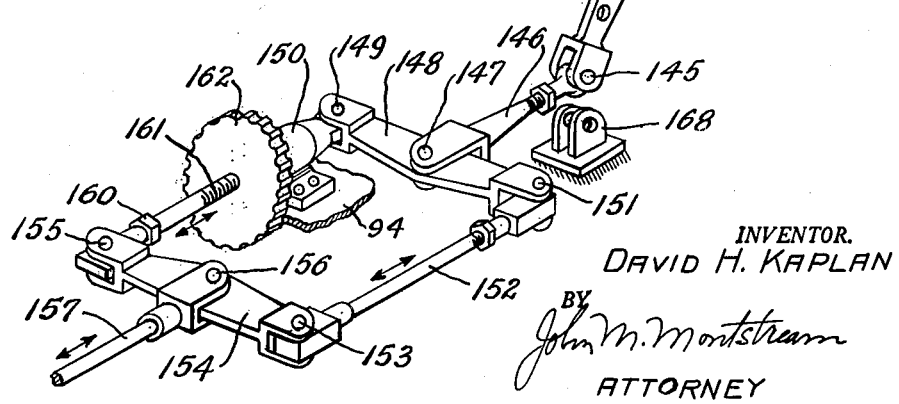
INVENTOR.
DAVID H. KAPLAN
BY
John M. Montstream
ATTORNEY

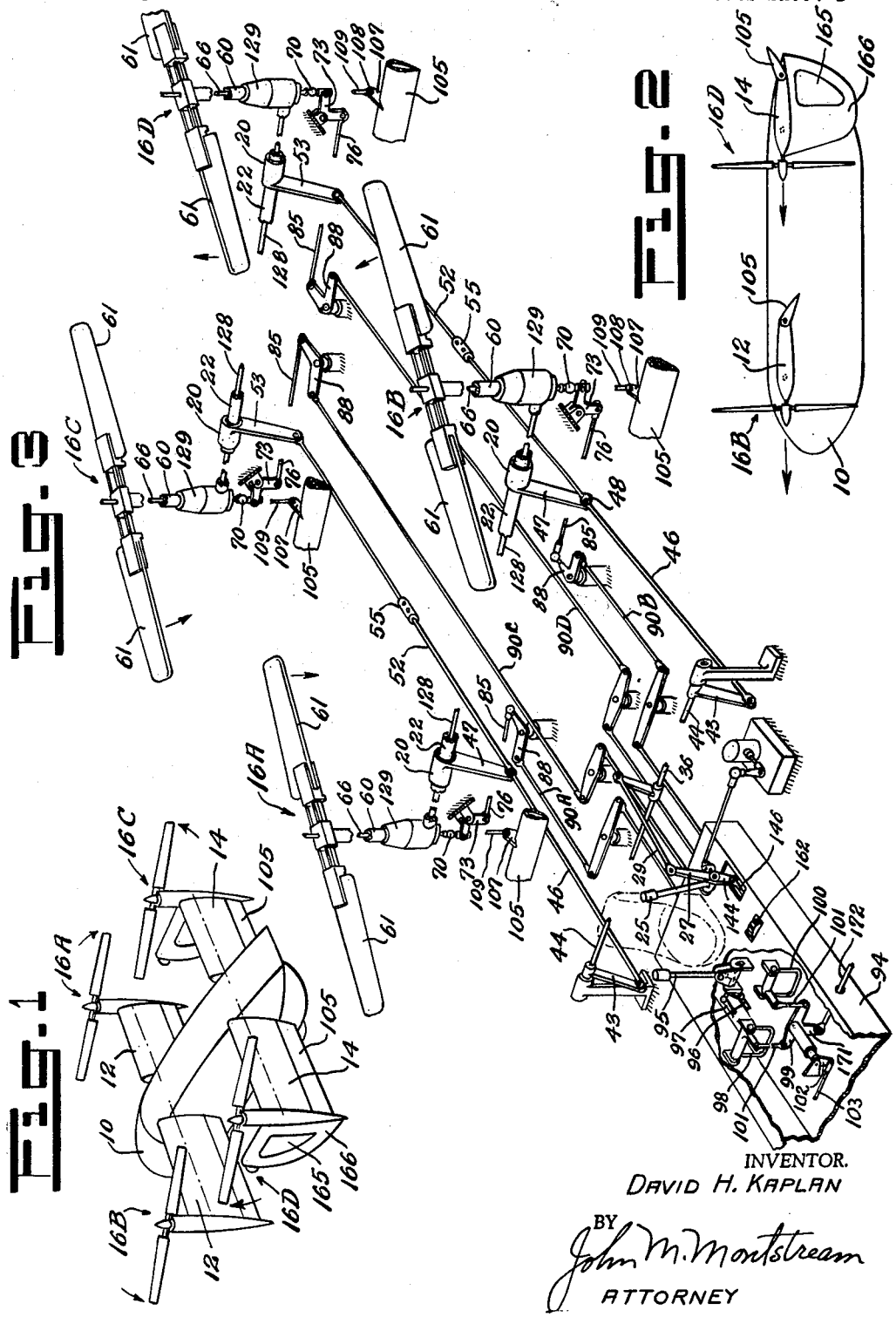

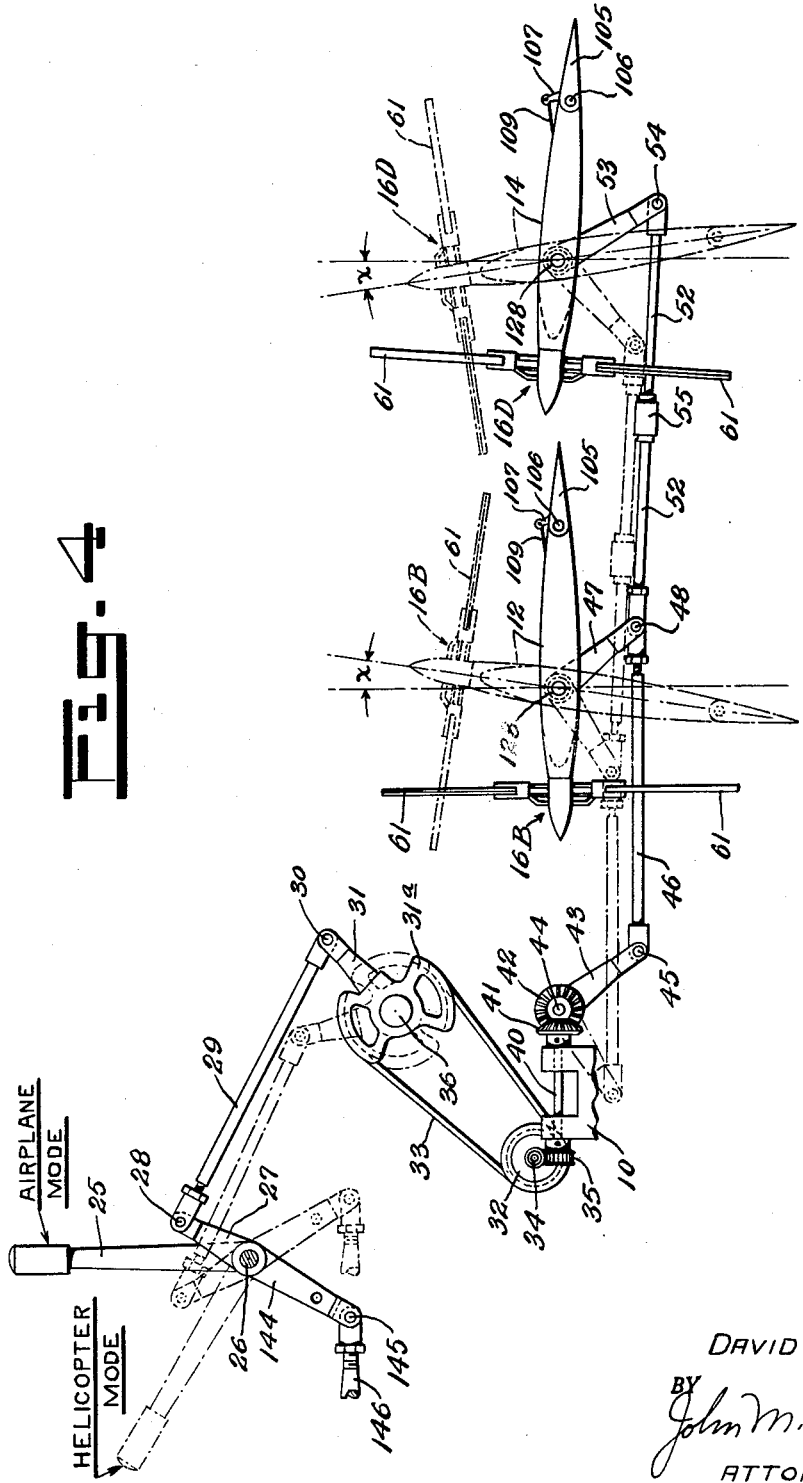

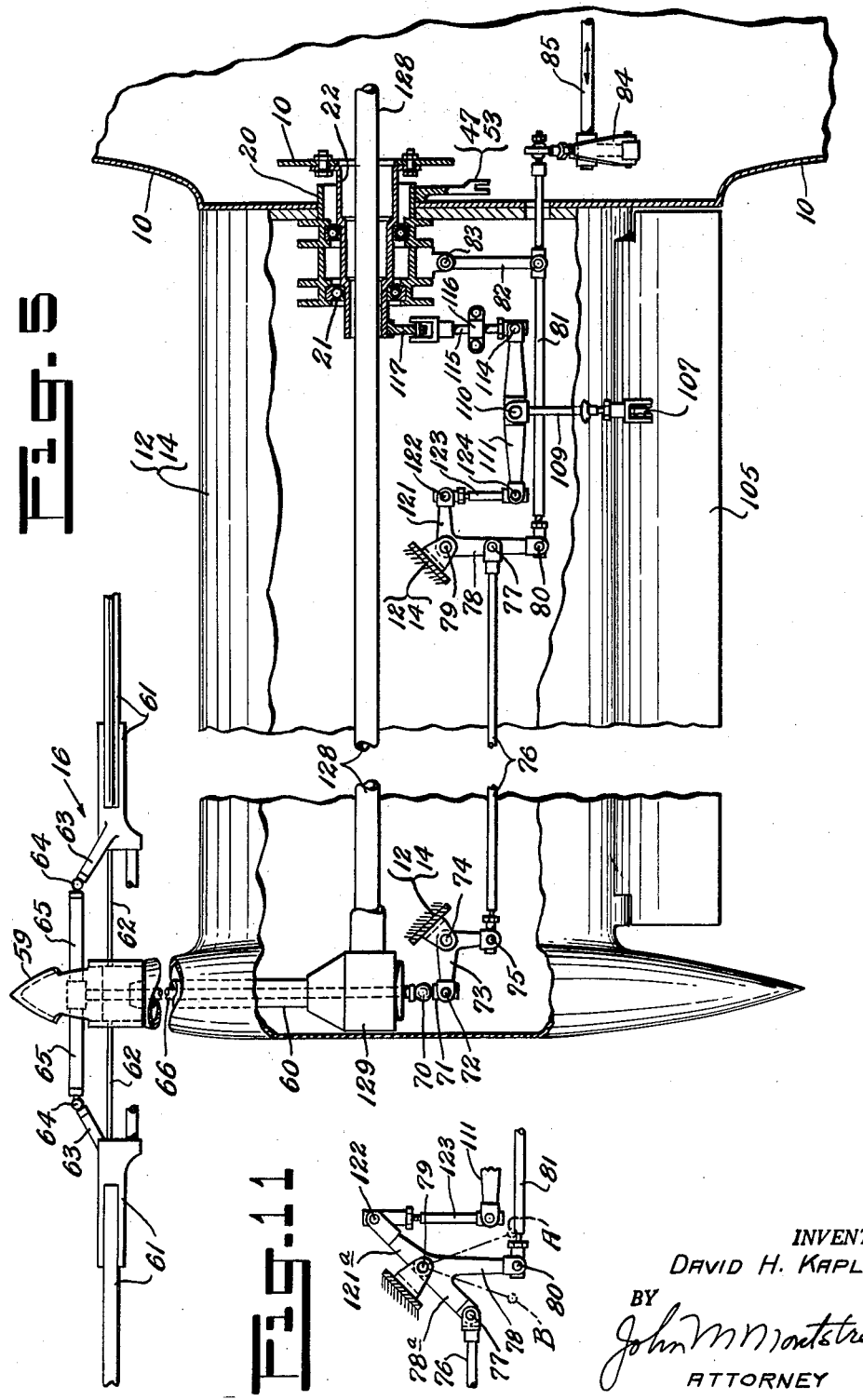

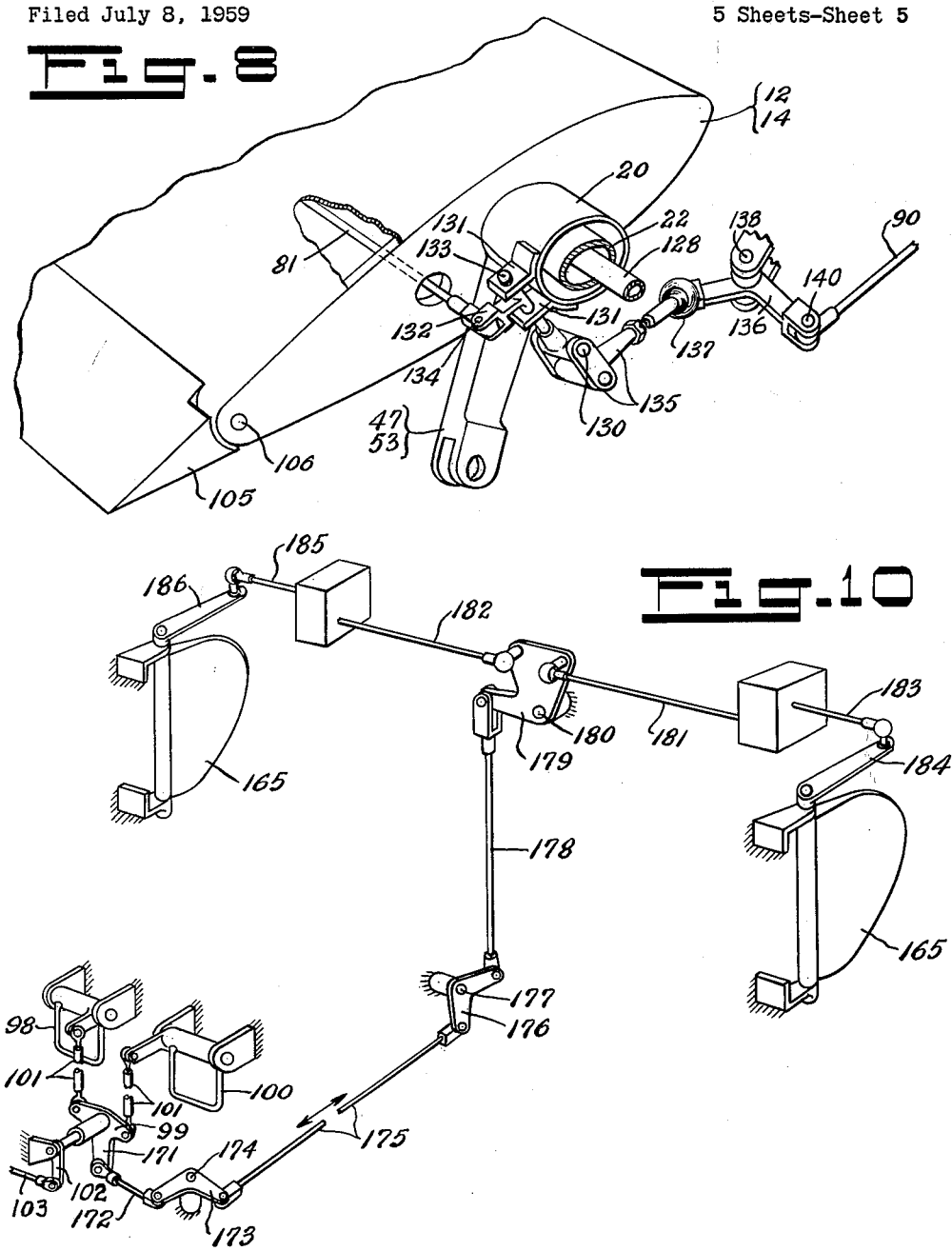

United States Patent Office 3,184,181
Patented May 18, 1965

3,184,181
CONVERTIPLANE WITH CONTROL MECHANISM
David H. Kaplan, Huntington, N.Y., assignor to Convertawings, Inc., Amityville, N.Y., a corporation of New York
Filed July 8, 1959, Ser. No. 825,719
52 Claims. (Cl. 244—7)

The invention relates to a convertiplane which is that type of aircraft having rotors which are pivoted to and from a position with their axes in vertical or generally vertical position, and a position where the axes of the rotors are horizontal or generally horizontal. In the first position the rotors serve for vertical take off and landing and flight as a helicopter and in the latter the rotors serve as airplane propellers. The aircraft uses wing means for the airplane mode of flight. The transition from one position to the other may and usually will occur during flight. The convertiplane of the invention is also constructed with the rotors carried by the wing means so that the wing means pivot with the rotors in the transition from one position to the other. The aircraft also is of that construction using four roto-propellers positioned in the form of a square or rectangle with the fore rotors in alignment at right angles to the longitudinal axis of the fuselage and the aft rotors are also in alignment at right angles to the longitudinal axis and spaced rearwardly from the fore rotors.

An object of the invention is to construct a tilt-wing convertiplane that is most efficient aerodynamically, and a control system having a most conservative arrangement for control of the aircraft.

Another object of the invention is to construct a tilt-wing convertiplane that has a simple control system.

Another object of the invention is to construct a unified control system which is used for both the airplane and helicopter flight modes or conditions.

Another object is to construct a unified control system so arranged that the pilot's stick and pedal controls are identical with those used in conventional aircraft and operated in the same way.

A further object of the invention is to construct a self-contained lift-propulsion system which can be used in plurality in a tilt-wing aircraft, said system being interchangeable when used in plurality.

A still further object is to construct a unified tilt-wing control system that is just as effective in the intermediate positions of wing and rotor tilt as it is at terminal positions for helicopter or airplane flight.

Another object of the invention is to construct a unified control system for a four rotor aircraft such that it will function safely with one rotor inactive.

Another object is to construct a system of hovering yaw control in a tilt-wing aircraft which does not require auxiliary propellers as used heretofore.

Also it is an object of the invention to construct a tiltable wing, a control mixing system scheduling wing tilt with blade pitch variation and with wing flap variation.

Another object is to construct means for transmitting rectilinear motion through a tiltable wing in a direction parallel to the wing axis and spaced from the tilt axis.

Another object of the invention is to construct a control system for tilt-wing aircraft with control mixing means for separately changing the pitch of the blades of the rotor and wing flap angles independently of the attitude or tilt of the wing.

A further object of the invention is to construct in a tilt-wing aircraft, a system of yaw control which operates for helicopter flight and for forward aircraft flight.

Also it is an object of the invention to construct in a tilt-wing convertiplane in which only one, and purely axial, motion is required to pass through a tiltable wing to secure flight control.

Other objects will be more apparent from the following description when taken in connection with the accompanying drawings illustrating preferred embodiments thereof in which:

FIG. 1 is a perspective view of the aircraft with the axes of the rotors in a general vertical or helicopter position;

FIG. 2 is an illustrative view of the aircraft with the axes of the rotor-propellers in a horizontal position and with the wing means in a horizontal or generally horizontal positions;

FIG. 3 is a diagrammatic view of the rotors and the pilot controls and their connections for pivoting the wing means and rotors and the connections with some parts not shown for changing the pitch of the blades of the rotor-propellers;

FIG. 4 is a detail view of the mechanism for pivoting the wing means and their rotor-propellers;

FIG. 5 is a view showing the connections through the wing means to the rotor blades of one rotor as well as a connection for a flap in which the flap position is changed with the pivoting of the wing means and interconnections for mixing of blade pitch control and wing means position;

FIG. 6 is a detail view of the connection for pitch control of the blades irrespective of the position of the wing means;

FIG. 7 is a detail view of the control of a flap position with the pivoting of the wing means;

FIG. 8 is an alternate construction of connection of the blade pitch change means into the wing means irrespective of the position of the wing;

FIG. 9 is a detail view of the connection between the pilot operated lever for wing means and tilt with blade pitch adjustment;

FIG. 10 is a diagrammatic view of the connection from the foot pedals to the rudders; and FIG. 11 is an alternate form of interconnecting lever between blade pitch connection and flap.

The convertiplane includes a fuselage 10 of any suitable construction, that illustrated being a single fuselage centrally located with respect to the wing means. The fuselage carries fore wing means, that shown including a pair of wings 12 projecting from each side of the fuselage. Aft wing means 14 is provided spaced rearwardly from the fore wing means 12 which also is a pair of wings extending laterally from the fuselage. Rotors or rotor-propellers 16 are mounted on the wing means and two laterally spaced rotors being provdied for each wing means or one rotor being provided for each of the four wings shown. Each rotor is mounted particularly at the end of its wing although it may be located in any position thereon as long as the rotors are spaced a substantial distance laterally from each other. This does not preclude intermeshing rotors. The fore rotors have been designated A and B and the aft rotors have been designated C and D with rotor A and C on the right and B and D on the left. The rotors provide a rectangular configuration or position, or particularly a square configuration with the fore and after rotors at right angles to the longitudinal axis of the fuselage which distinguishes from a so-called diamond configuration. The invention is applicable to that type of construction having spaced fuselage with a single fore and after wing means extending between the fuselage.

The wings or wing means (FIG. 5) are pivotally mounted on the fuselage in any suitable manner so that the wings and their rotors pivot together through an angle generally of about 90 degrees in extent, as will appear hereinafter. The pivotal mounting particularly shown includes a bearing member 20 which is secured to the respective wings 12 and 14. The bearing member 20 carries a pair of spaced bearings 21 which receives an axle 22, preferably tubular, one end of which is secured to the fuselage 10 and hence forms a part thereof.

The wings or wing means are pivoted by pilot or wing operating means illustrated in FIG. 4. This means may take several forms and a simple form is illustrated. This wing operating means is particularly constructed when used with a collective pitch operating mechanism, such as that of my application S.N. 761,422, filed September 16, 1958, now Patent No. 3,008,524, so that the fore wing means 12 is rotated through a greater extent than the aft wing means 14. In other words, the fore wing means and their rotors are pivoted through an angle X greater than 90 degrees so that the wing means are inclined angularly rearwardly whereas the aft wings and their rotors are pivoted through an angle of less than 90 degrees by an angle X so that the aft rotors are inclined angularly forwardly. The angle of tilt is the same for both wing means.

The pilot or wing operating means particularly shown includes an operating lever 25 pivotally mounted on the fuselage on a pivot 26 which lever carries an extension or arm 27. The extension 27 carries a pivot 28 for pivotally mounting a connecting rod 29 thereto and the other end of this rod is pivotally connected through a pivot 30 with a lever 31 and pulley 31a. This pulley rotates a pulley 32 through chains or belts 33 secured to the respective pulleys and the pulley 32 rotates a driving worm 34 which in turn rotates a driven worm 35. The worm connection 34, 35 constitutes an irreversible connection such that pressure from the wing means, flaps or other mechanism is not transmitted backwardly to the pilot operated lever 25.

The irreversible drive mcehanism 34, 35 is connected to the wings or wing means through a drive shaft 40 on which is secured a bevel gear 41 which gear is in mesh with a bevel gear 42 carried by a lever 43 pivotally mounted on a shaft or bearing 44 carried by the fuselage. The lever 43 carries a pivot 45 to which is connected a rod 46 and this rod is connected with a pivot arm 47 for the fore wing means 12 through a pivot 48. The pivot arm 47 is secured to the wing means and is so proportioned or has a length of arm such that the fore wing means 12 is swung through an angle of 90 degrees plus an angle of X so that the wing means is inclined rearwardly. The inclination of the wing itself is unimportant and the incline rearwardly is important only in connection with the rotors carried by the wing means so that their rotor axes are inclined rearwardly. The arms may be substituted for gear means having gear ratios to accomplish the same result.

The pivot arm 47 is connected with the aft wing means 14 through a connecting link 52, one end of which is mounted on the pivot 48 and the other end is connected with a pivot arm 53 connected with the aft wing means 14 through a pivot 54. The pivot arm 53 is secured to the wing means 14. The pivot arm 53 is proportioned longer than the pivot arm 47 so that this arm and hence the wing means 14 is pivoted through an angle of less than 90 degrees by the angle X so that the aft wing means is inclined forwardly by an angle X. Here again the inclination of the wing means is unimportant but the important feature is that the axes of the rotors carried by this wing means is inclined forwardly.

Means are provided so that the rearward incline and forward incline may be increased or decreased as desired. This is accomplished by an extender 55 forming a part of the connecting link 52. This extender may take various forms such as a left hand and right hand thread screw jack or cam and its purpose is to lengthen or shorten the connecting link 52. Lengthening the connecting link 52 increases the angle X of both units and shortening the connecting link 52 decreases angle X of both units. The extender is located within the fuselage so that it may be adjusted during flight for trim and/or stability.

With the pilot or wing operating lever 25 in the position shown in solid lines the wing or wing means 12 and 14 are in horizontal or generally horizontal position. In order to convert the aircraft into a vertical take off and landing aircraft, the pilot operating lever 25 is moved to the dashed line position which pivots the pivot arm 47 and 53 to their dashed line positions and thereby pivots the wings or wing means and the rotors to their dashed line positions in which the wings are generally vertical and the planes of the rotors or rotor blades have been shifted from a vertical position to a generally horizontal position with the inclination as described. It is clear that the wing operating lever may be shifted to a position in which the wings in horizontal position may have their leading edges tilted slightly upwardly. Preferably the rear wings have an initial small tilt upwardly to compensate for the airstream from the fore wings which is flowing angularly downwardly.

The rotors 16 may be of any suitable construction, that illustrated being a two bladed rotor. The blades are mounted for pitch change in any known fashion. A simple form of rotor construction is illustrated which includes a rotor head 59 mounted on a rotatable rotor shaft or mast 60. The blades 61 are shown attached to the head 59 through a pair of spaced strap means 62, the resiliency of which will permit the pitch of the blades to be changed. In order to secure pitch change, each blade has a pitch change arm 63 secured thereto which arm is connected through a pivot 64 to a spider 65. The arm 63 is shown particularly as extending from the trailing edge of the blade. The spider 65 is rotatably mounted on a push rod 66 slidably mounted in the shaft 60 for axial movement. Vertical upward movement of the push rod 66 lifts the spider 65 and since each pitch change arm 63 is connected on the trailing edge side of the blade, this decreases the pitch angle of the blades. Similarly downward movement of the blade push rod 66 depresses the trailing edge of each blade and increases the pitch of the blade.

The output connecting means with the push rod 66 for the blades through the wing means is the same for each wing and is shown in FIG. 5. This connection includes a pivot 70 on the end of the push rod 66 which mounts a connecting rod 71 which is pivotally connected through a pivot 72 to one arm of a bell crank 73 which is pivotally mounted on a pivot 74 carried by a part of the structure of wing 12 or 14. The other arm of the bell crank 73 is pivotally connected through a pivot 75 with a connecting rod 76, the other end of which rod is pivotally connected through a pivot 77 with one arm 78 of a bell crank which is pivotally mounted on a pivot 79 carried by a part of the wing structure or frame. Arm 78 is connected through a pivot 80 to a connecting rod 81 which is supported for lateral movement on a lever 82 pivotally mounted on a pivot 83 carried by the wing structure. The other end of the connecting rod 81 is connected through any suitable arrangement for transmitting lateral or rectilinear motion irrespective of the position of the wing, that illustrated being a scissors linkage 84. The scissors linkage is pivotally connected on a connecting rod 85 which is mounted for longitudinal movement on a lever 86 pivotally mounted on a pivot 87 suitably carried by the fuselage. Longitudinal movement of the connecting rod 85 is secured by a connection with one arm of a bell crank 88 pivotally mounted on a pivot 89 carried by the fuselage 10 and the other arm of this bell crank is connected with a connecting rod 90 through a pivot 91. There is a connecting rod 90 for each rotor and they have been given the designation corresponding to the rotor namely 90A, 90B, 90C and 90D, as shown in FIG. 3. These connecting rods may be connected directly with the pitch operating mechanism 94 although some additional linkage is shown in FIG. 3.

Each of the conecting rods or output means 90 A, B, C and D is connected to a pitch operating mechanism generally illustrated as a box 94. As will appear hereinafter the operating lever 25 provides a first input means. This operating mechanism is connected with the control stick 95 which in known fashion has fore and aft pivotal movement, which movement is inserted into the pitch operating mechanism through an input lever 96, forming a second input element. The control stick also has lateral pivotal movement which movement is transmitted into the pitch operating mechanism through a lever 97 forming a third input element. The pilot operating means also includes a right foot pedal 98 pivotally mounted on the frame or box and connected by link 101 to one end of a lever 99 pivotally mounted on the frame of the operating mechanism. A left foot pedal 100 is pivotally mounted on the fuselage or frame of the pitch operating mechanism and is connected with the other end of the lever 99 by a like link 101. A lever 102 connected with or forming a part of lever 99, has a connecting link 103 which forms a fourth input element. These are the usual controls provided a pilot and are operated in the customary manner in controlling the flight of any or most aircraft.

The pitch operating mechanism is disclosed in patent application Serial No. 761,422, filed September 16, 1958, and in Serial No. 816,769, filed May 29, 1959, now Patent No. 3,076,354, which is applicable with the mechanism herein. So far as the construction described herein is concerned it merely need be stated that upon forward movement of the control stick, the pitch of the blades of the fore rotors is decreased and the pitch of the aft rotors is increased which provides downward pitch of the nose of the aircraft, as well as forward flight. Rearward movement of the stick increases the pitch of the blades of the fore rotors and decreases the pitch of the blades of the aft rotors for a nose up maneuver. Lateral movement of the control stick to the right increases the pitch of the blades of the left hand rotors B and D and decreases the pitch of the blades of the right hand rotors A and C which gives right hand roll to the aircraft. In the same manner lateral movement of the control stick to the left produces increase in the pitch of the blades of the right hand rotors A and C and decreases in pitch of the blades of the left hand rotors B and D and a left hand roll of the aircraft. Operation of the right foot pedal produces an increase in the pitch of the blades of the cross rotors A and D and a decrease in pitch of the blades of the cross rotors B and C to provide a right yaw. Operation of the left pedal increases the pitch of cross rotors B and C and decreases the pitch of the blades of the rotors A and D to produce a left yaw. Because of the tilt of the rotors, the increase in pitch of the blades of the cross rotors provide a force couple of the horizontal component which turns the aircraft on a vertical axis. It will be noted, therefore, that the pilot controls for control stick and pedals remain the same as it has always existed and produces the same aircraft maneuvers. It will also be noted that these maneuvers are accomplished by increase in pitch of the blades of one pair of rotors and decreased pitch of the other pair of rotors. It will also appear hereinafter that the pitch of all blades may be increased.

Each wing means is provided with a pair of flaps 105 each of which is pivotally mounted on the trailing edge of the wing means on a pivot 106. With an aircraft having four wings there is a flap for each wing or a flap is provided for each rotor. This flap has a flap arm or horn 107 secured to the flap and if the flap is secured to the pivot 106 then the arm may be secured thereto. The end of the flap arm is attached through a pivot 108 to one end of a connecting rod 109 and the other end thereof is connected with a pivot 110 carried between the ends of a floating lever 111. As shown, the pivot 110 is at the midpoint of the lever though it need not be in the event a differential in control should be desired.

Flap depressing mechanism is provided so that as the wing means pivot to and from their generally vertical position and generally horizontal position, all of the flaps are depressed during the transition from one position to the other. At the terminal positions the flaps are in initial position or in alignment with the central plane or chord of the wing means. Preferably this mechanism is a flap depressing means for each flap so that an interconnection may be made, as will appear. The particular means shown by which this result is achieved is a cam means connected with one end of the lever 111 through a pivot 114 to a push rod 115 mounted in a bracket 116 for longitudinal movement. This push rod is connected with, or forms a part of, the flap depressing or cam means. In the construction shown cam 117 (FIG. 7) is provided for each flap and is secured to one of the parts including the fuselage or the wings means. The cam is shown as carried by the fuselage and is conveniently attached to the end of the axle 22 for the wing means. This cam has a cam slot 118 in which rides a cam follower 119 on the push rod, forming a part of the cam means carried by the other part or wing means. It will be noted that both terminal ends of the cam slot may be arcuate and radially equidistant from the axis of the wing axle 22 so that the flaps are unaffected by short range shifting of the lever 25 and movement of the wing means at the terminal positions thereof. Between these terminal ends of the cam slot, the slot bulges outwardly which depresses the flaps in the transition between the terminal positions. The flaps are used to cancel out normal forces produced by each propeller which tend to pitch the aircraft. These forces are additive. The lateral forces of each propeller inclined at an angle to flight velocity cancel out.

When the wings are in generally horizontal position, and the aircraft is in flight as an airplane, as well as in any inbetween position, the control stick and foot pedals continue to control the pitch of blades of the propeller-rotors. For control also there is an interconnecting means between the pitch control mechanism and the flap operating means. This interconnecting means includes the other arm 121 of the bell crank 78 which is connected through a pivot 122 and link 123 with a pivot 124 carried by the other end of the floating lever forming a sort of whiffletree. It will be noted, therefore, that pitch control of the blades of each rotor also effects a change in the position of the related or cooperating flap. The interconnection between the pitch control mechanism and the floating lever is such that when the pitch of the blades is in hovering position, the flap is in, or approximately in, alignment with the center plane or chord of the wing means. Upon an increase in the pitch of the blades of a rotor its corresponding flap is depressed or tilted downwardly. Upon a decrease of the pitch of the blades of a rotor, the corresponding or cooperating flap is raised. With this interconnecting means control of the aircraft in airplane type flight is secured through the pitch control mechanism, pilot operated stick and foot pedals without any change in their connections or operations. For example, if the stick is pushed forward, the pitch of the aft rotors is increased which tilts the corresponding aft flaps downwardly and the pitch of the blades of the fore rotors is decreased which turns their corresponding flaps upwardly and the aircraft pitch is downwardly. Similarly pulling the stick rearwardly reverses the blade pitch condition and reverses the tilt of the flaps so that the aircraft noses upwardly. It will be noted that any differential change in the pitch of the blades of the fore and aft rotors produces no flight effect since the axial pull of the four propellers are balanced.

Lateral movement of the control stick to the right increases the pitch of the left hand pair of rotors and therefore tilts their corresponding flaps downwardly while the pitch of the right hand rotors is decreased which tilts their flaps upwardly. This produces a roll of the aircraft to the right. In the same manner lateral movement of the stick to the left reverses the blade pitch, or increases the pitch of the blades of the right side rotors and depresses their flaps and decreases the pitch of the blades of the left side rotors which also tilts upwardly their correlated flaps to produce a left roll. Pushing of the right foot pedal 98 increases the pitch of the blades of the cross pair of rotors A and D and likewise depresses the tilt of the flaps for these rotors whereas the pitch of the blades of the other pair of rotors B and C is decreased and their flaps are raised or inclined upwardly to produce a right yaw of the aircraft with the rudder 165 giving a large measure of the control as will appear. Similarly pressing of the left food pedal 100 forwardly produces a left yaw of the aircraft.

The same flap movements occur upon operation of the stick and foot pedals as described when the rotor axes are generally vertical or in helicopter mode. The flaps, however, are not horizontal so that the comparable flap movement is to the left for an increase in pitch of the blades and to the right for a decrease in pitch which aids helicopter maneuvering.

The rotors may be driven by a single motor within the fuselage of the aircraft and connected to each of the fore and aft rotors through a drive shaft 128 extending through the tubular axle 22 and through the fore and aft wing means and is connected through a gear transmission in a gear box 129 with the mast of the respective rotor. It is clear that each rotor may have a separate motor connected with its rotor shaft or mast to rotate the same in which event it is desirable that the fore rotors are connected together through the connecting drive shaft 128 and the rear rotors connected together to the rear drive shaft 128 in the event one of the motors should go dead. It is clear too that even with a motor at each rotor they all may be connected together through the shafts 128.

For best aerodynamic results the axle and pivot axis of the wing is located at or approximately at the point where the moments acting on the wing are maintained. This point is approximately one fourth of the chordwise dimension from the leading edges. It is desirable too that the chordwise center of gravity be located at or near this axis.

An alternative construction to that shown in FIG. 6 for transmitting rectilinear movement into the wing means irrespective of its pivotal movement is illustrated in FIG. 8. In this connection the wing bearing 20 carries a pair of spaced brackets 131 in which is mounted a lever 132 on a pivot 133 and this lever carries a pivot 134 which is attached to the connecting rod 81. A scissors linkage 135 is secured on the pivot 133 through a laterally extending pivot 130 to turn the same. The connection for turning this scissors linkage and the pivot 133 includes a bell crank lever 136 pivotally connected with the scissors linkage through a ball joint or pivot 137 and the bell crank is pivotally mounted on the fuselage through a pivot 138. The other arm of the bell crank is connected with the connecting link 90 through a pivot 140. The link 90 is a part of the output connecting means previously described. Brackets 131 are mounted on the axle 20 in a position such that the arm 132 is connected with the push rod 81 of the output connecting means previously described.

It has been described hereinbefore that the control stick 95 increases the pitch of the blades of one pair of rotors and decreases the pitch of the blades of the other pair of rotors. Means are provided whereby the pitch of the blades of all four rotors may be increased at one time or decreased at one time. In other words, if the pilot wishes to take off or rise vertically in helicopter mode, he increases the pitch of the blades of all of the rotors at one time. To descend vertically the pitch of the blades of all rotors is decreased. In the prior application referred to herein of the control or operating mechanism 94 there is a first control or input element, operation of which increases or decreases the pitch of the blades of all of the rotors. This maneuver is accomplished by the construction shown in FIG. 9 wherein the operating lever 25 has an extension or arm 144 which carries a pivot 145 for a connecting rod 146, the other end of which rod is connected through a pivot 147 with an arm 148 pivotally mounted on a pivot 149 carried by a bracket 150 mounted on the fuselage 10. The bracket 150 is the equivalent of the fuselage. The end of the arm 148 carries a center pivot 156 to which is connected a connecting rod 152, the other end of which rod is pivotally connected with a pivot 153 carried by an arm 154 which arm is pivotally mounted on a pivot 155. The arm 154 carries a center pivot 156 to which is connected to connecting rod 157. The connecting rod 157 is connected into the blade pitch operating or control mechanism 94 and increases or decreases the pitch of the blades of all of the rotors at one time from an initial or normal blade pitch setting. Such a connection is shown in the prior application Serial No. 761,422. In a broader aspect of the invention the pitch operating mechanism may be one in which collective pitch change or changes of the pitch of the blades of all rotors is the sole control provided. In another aspect, the aircraft may have collective control of the blades of the rotors and forward helicopter mode of flight is secured by differential control of the blades of fore and aft pairs of rotors and roll is secured by differential control of the blades of the side pairs of rotors. In such construction yaw may be secured by known yaw control.

With the pitch of the blades adjusted to hovering position, movement of the operating lever 25 in one direction, for example forwardly, will move the connecting rod 157 to the left as viewed in FIG. 9 and increase the pitch of the blades of all of the rotors to cause the aircraft to rise vertically. Movement in the other direction will decrease the pitch of the blades of all of the rotors for vertical descent. It is clear that this relationship may be reversed if desired. It is clear too that the connecting rod 157 may be directly connected with the pivot 145 of the extension 144. This operation of the operating lever 25 at its terminal ends will be accompanied by some wing and hence flap movements as will be described.

In order to enable the pitch of the blades of all of the rotors to be increased at one time or decreased at one time without wing or flap depressing movement, auxiliary pitch change means is used as particularly illustrated in FIG. 9. The pivot 155 may normally be regarded as being fixed; however, it is carried by a pitch adjusting rod 160 which is adjusted to change the position of the pivot 155 and in so doing shifts connecting rod 157 to change the location of the pivot 156 and projects the connecting rod 157 to the left or the right with the shifting of the position of the pivot 155. The connecting rod provides a first input element to the operating mechanism 94. This adjustment may be secured in any suitable manner; however the construction particularly illustrated shows a screw jack form in which a screw thread 161 is carried by the adjusting rod. This screw thread is received in a hand wheel 162 having threads to receive the screw threads 161 and hence the hand wheel is a form of nut. The hand wheel 162 is rotatably secured to the bracket 150 in any convenient manner. By rotating the hand wheel 162 the pitch of the blades of all of the rotors may be increased or decreased and in this manner secure the adjustment of the blades without operation of the wing operating means or lever 25 and without pivoting of the wing means. Flap movements are secured; however, dependent upon blade pitch changes through the arm 121 of the interconnecting means and the direction of flap movement is dependent upon whether the pitch of the blades is increased or decreased.

It will be observed, therefore, that in moving the lever 25 when connected with the collective pitch change or first input element 157 through the means of FIG. 9, from its essentially horizontal or down position to its vertical position in order to swing the wings and rotor axes from a generally horizontal position to a generally vertical position, the pitch of the blades of all rotors is increased through the connection 144, 146, 152, 157 and the pitch operating mechanism 94 as required in the helicopter mode of flight. The reverse movement of pitch change lever 25 decreases the pitch of the blades in a conversion to airplane mode of flight. Without any other adjustment, the lever 25 controls the collective pitch of the blades of all rotors through a high pitch change range when the lever 25 is in down position and a relatively lower pitch change range when it is in its up or vertical position in airplane mode of flight. It is understood of course that turning of the hand wheel 162 in either of the terminal positions of the operating lever will make adjustment of the collective pitch of the blades either increase or decrease the pitch for all of the rotors without operation of the operating lever 25.

The collective pitch of the blades of all of the rotors may be increased or decreased simultaneously by operation of the operating lever 25. This may occur at either terminal position of its movement without operation of the flaps through movement of the wing since the cam slot 118 has a short arcuate portion at its terminal ends equidistant from the axis of rotation of the wing. Upward or downward flap movement, however, does occur through the interconnecting means or particularly arm 121 of the bell crank forming a part of the pitch change connection through the wing from the control stick and foot pedals.

With the wings and the axes of the propellers in generally horizontal position for aircraft mode of flight, forward movement of the control stick decreases the pitch of the blades of the fore propellers and increases the pitch of the aft propellers, the effect of which is of no importance since the axial thrusts are additive. This stick movement, however, raises the flaps of the fore wing means and depresses the flaps of the aft wing means to produce a downward pitch of the aircraft about its center of gravity. Moving the stick rearwardly increases the pitch of the fore propellers and decreases the pitch of the rear propellers which again is of no effect since the thrust of the propellers is additive but this stick movement depresses the flaps of the fore wing means and raises the flaps of the aft wing means which produces a nose up or upward pitch maneuver about the center of gravity of the aircraft. Lateral movement of the stick increases the pitch of the blades of the rotors on one side and depresses the flaps on this side and decreases the pitch of the blades on the other side and raises the flaps on this side for roll to right or left. Operation of the foot pedals changes the pitch of the cross pairs of propellers as described in the helicopter mode and introduces a differential thrust at diagonally opposite propellers with the thrusts on each side being equal and of no effect. The yaw of the aircraft is augmented by the use of rudders 165 mounted in panels 166 carried by the ends of the aft wing means 14 which are operated by a control described hereinafter.

The means for changing the pitch of the blades of all four rotors in the same direction is shown as connected with the wing operating means or lever 25 for changing the position of the wing means. It is clear that the hand wheel and its screw jack may be separated or disassociated from the lever by disconnecting the connecting rod 146 at the pivot 145 and anchoring the lever 148 separately from the arm 144 such as to the frame or fixed bracket 168 in which case increase or decrease of the pitch of the blades for all four rotors is secured solely through the hand wheel 162 and its screw jack. So connected the wing operating means changes the position of the wing means and changes the position of the flaps during the transition through the cams 118.

In some forms of convertiplanes the rotors alone are swung from vertical to horizontal position and the wings remain fixed. In such types the invention herein is fully applicable in which event the rotors have their own frame as distinguished from the wings serving a double function herein, as a rotor frame and as wings.

FIG. 11 shows another form of interconnecting lever 78 which may be substituted for that of FIG. 5. The interconnection between the blade pitch or output connecting means and the flap depressing means is desirably such that in helicopter mode of flight or generally vertical position of the wing means, the flap movement is minimized and the blade pitch movement is at its maximum over normal flight movements of the operating lever 25, stick and foot pedals. This interconnecting lever also, in airplane mode of flight, or generally horizontal position of the wing means, minimizes blade pitch change and secures maximum flap movement over normal or terminal operating range or normal in stick and pedal movements. When lever 25 has been moved to helicopter flight position, the pivot 80 is at point A as a central position and this pivot moves over a relatively short range on either side under normal flight operation of operating lever 25. In this position arm 78 is at or approximately at right angles to rod or link 76 or its effective position and transmits maximum movement to the connections with the blades. Arm 121a, on the other hand, transmits minimum movement to link or rod 123 and hence to the flap. When pivot 80 is in position B for airplane mode, movement of the operating lever 25 moves pivot 80 and the interconnecting lever over a range on both sides of position B and arm 121a is then at or approximately at right angles to link 123 or effective position to transmit maximum movement of the flaps. Pivot 77 on the other hand is now in a position which produces minimum changes in the movement of link 76 and in the pitch of the blades. A maximum effect is secured if the arms 78a and 121a move through 90°. The same result is achieved if the links or rods are pivoted to the same pivot or attached to the same arm, the requirement being that the two effective or ineffective positions of the links are at or approximately at right angles to each other. This ineffective position would be that in which the link is in line with the pivot 79.

The rudders 165 are operated by the foot pedals for assisting in the control of the aircraft in airplane mode of flight. The connection may be made in many ways such as illustrated in FIG. 10. The lever 99 has a lever 171 which is connected by a link 172 to a bell crank 173 pivotally mounted on the frame on a pivot 174. The bell crank is connected by a link 175 to a bell crank 176 pivotally mounted on a pivot 177 carried by the fuselage. This bell crank is connected by a link 178 to a bell crank 179 pivotally mounted on the fuselage on a pivot 180. The bell crank 179 is connected through ball joints with link 181 connected with the left rudder and a link 182 connected with the right rudder. A suitable linkage such as illustrated in FIG. 6 connects the link 181 with a rudder link 183 which link is connected to a rudder lever 184 to pivot the left rudder 165. The link 182 is similarly connected through a mechanism similar to that shown in FIG. 6 to a rudder link 185 which link is in turn connected with a rudder lever 186 for pivoting the right rudder. Operation of the foot pedals operates cross pairs of flaps in the same direction and the rudders for a yaw maneuver.

Although differential control of the blades of cross pairs of rotors is particularly shown for a yaw maneuver, it is to be understood that in a broader view of the invention this maneuver may be accomplished by conventional tail rotor means.

This invention is presented to fill a need for improvements in a convertiplane with control mechanism. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A convertiplane comprising a fuselage, a pair of wing means carried by the fuselage in spaced fore and aft position, each wing means including at least one wing and each wing having a leading edge and a chord, mounting means carried by the fuselage and mounting each wing means for pivotal movement to and from a generally horizontal position and a generally vertical position, wing operated means connected with the wing means to pivot the same, a pair of rotors carried by each wing means in laterally spaced relation and each rotor having blades, rotor mounting means mounting each rotor for rotation on the wing means on an axis through or adjacent to the chord of the wing means and ahead of the leading edge thereof, means mounting the blades for pitch change; pitch operation mechanism having four output means and having input means for collective and differential operation of the output means and collective and differential pitch change of the blades; means connected with the input means to operate the latter, output connecting means between the output means and the blades of the rotors, flaps pivotally mounted on the wing means, and flap depressing mechanism operable by pivoting of the wing means and connected with the flaps to depress the same in the transition of the wing means between horizontal and vertical positions.

2. A convertiplane as in claim 1 in which the flap depressing mechanism has terminal positions when the wing means are in generally horizontal and generally vertical positions and the flap depressing mechanism being constructed to retain the flap means in substantial alignment with the wing means for a limited range of movement of the flap depressing mechanism in terminal positions.

3. A convertiplane as in claim 2 in which the flap depressing mechanism includes a cam carried by one of the parts including the fuselage and the wing means, and a cam follower engaging the cam and carried by the other part.

4. A convertiplane as in claim 3 in which the cam has terminal portions of arcuate form to retain the flaps in fixed position over a short range of pivoting of the wing means at terminal positions.

5. A convertiplane as in claim 1 in which the flap depressing mechanism includes a flap depressing means for each flap, including an interconnection between each output connecting means and the flap depressing means to depress the flaps upon an increase in blade pitch and to raise the flaps upon a decrease in blade pitch.

6. A convertiplane comprising a fuselage, a pair of wing means carried by the fuselage in spaced fore and aft position, each wing means including at least one wing and each wing having a leading edge and a chord, mounting means carried by the fuselage and mounting each wing means for pivotal movement to and from a generally horizontal position and a generally vertical position, wing operating means connected with the wing means to pivot the same, a pair of rotors carried by each wing means in laterally spaced relation, rotor mounting means mounting each rotor for rotation on the wing means on an axis through or adjacent to the chord of the wing means and ahead of the leading edge thereof, each rotor having blades, means mounting the blades for pitch change; pitch operating mechanism having four output means and having input means for collective and differential operation of the output means and collective and differential pitch change of the blades; means connected with the input means to operate the latter, output connecting means between each output means and the blades of one of the rotors, flaps pivotally mounted on each wing means, and a connection between the output connecting means and the flaps to depress the flaps upon an increase in pitch of the rotor blades and to raise the flaps upon a decrease in the pitch of the rotor blades.

7. A convertiplane comprising a fuselage, a pair of wing means carried by the fuselage in spaced fore and aft position, each wing means including at least one wing and each wing having a leading edge and a chord, mounting means carried by the fuselage and mounting each wing means for pivotal movement to and from a generally horizontal position and a generally vertical position, wing operating means connected with the wing means to pivot the same, a pair of rotors carried by each wing means in laterally spaced relation and each rotor having blades, rotor mounting means mounting each rotor for rotation on the wing means on an axis through or approximately through the chord of the wing means and ahead of the leading edge thereof, means mounting the blades for pitch change; pitch operating mechanism having four output means and having input means including an input element for operating the output means for collective pitch change; output connecting means between the output means and the blades of the rotors, and a pitch change connection between the wing operating means and the aforesaid input element.

8. A convertiplane as in claim 7 including an auxiliary pitch change means in the pitch change connection.

9. A convertiplane as in claim 8 including means to disconnect the connection between the wing operating means and auxiliary pitch change means and to attach the latter to fixed point.

10. A convertiplane as in claim 7 including a pair of spaced flaps pivotally mounted on each wing means, and flap depressing means connected between the fuselage and the flaps to depress the latter between transition of the wing means from one to the other of its positions.

11. A convertiplane as in claim 10 in which the flap depressing means including a cam carried by one of the parts including the fuselage and the wing means and a cam follower carried by the other part and engaging the cam.

12. A convertiplane as in claim 11 in which the cam has arcuate terminal portions at each end for a limited range of blade pitch change and movement of the wing means without flap depression.

13. A convertiplane as in claim 11 in which the mounting means for the wing means includes an axle and the cam is carried on the axle.

14. A convertiplane as in claim 7 in which the wing operating means includes a connection between the wing means constructed such that the forewing means pivots through an angle greater than 90° and the aft wing means pivots through an angle of less than 90°.

15. A convertiplane as in claim 7 including a pair of laterally spaced flaps pivotally mounted on each wing means, and a connection between each output connecting means and the adjacent flap to depress the flap for blade pitch increase and to raise the flaps for blade pitch decrease.

16. A convertiplane as in claim 15 in which the wing operating means includes a connection between the wing means constructed such that the fore wing means pivots through an angle greater than 90° and the aft wing means pivots through an angle of less than 90°.

17. A convertiplane as in claim 15 including flap depressing mechanism connected between the fuselage and the flaps to depress the flap means in the transition between the generally vertical position and generally horizontal position.

18. A convertiplane as in claim 15 in which the pitch change connection between the wing operating means and the input element includes an auxiliary pitch change means.

19. A convertiplane as in claim 18 including flap depressing mechanism carried by the fuselage and the wing means and connected with the flaps to depress the same upon transition of the wing means between generally horizontal position and generally vertical position.

20. A convertiplane comprising a fuselage, a pair of wing means carried by the fuselage in spaced fore and aft position, each wing means including at least one wing and each wing having a leading edge and a chord, mounting means carried by the fuselage and mounting each wing means for pivotal movement to and from a generally horizontal position and a generally vertical position, wing operating means connected with the wing means to pivot the same, a pair of rotors carried by each wing means in laterally spaced relation and having blades, rotor mounting means mounting each rotor for rotation on the wing means on an axis through or approximately through the chord of the wing means and ahead of the leading edge thereof, means mounting the blades for pitch change; pitch operating mechanism having output means including four output elements one for the blades of each of the rotors to change the pitch of the blades thereof, the pitch operating mechanism having input means including a first input element for operating all output elements in the same direction, a second input element for differentially operating the output elements for the fore pair and aft pair of rotors, a third input element differentially operating the output elements for the side pairs of rotors, and a fourth input element differentially operating the output elements for the cross pairs of rotors; means to operate the first input element, a pilot operated stick, means mounting the stick for fore and aft movement and the stick being connected with the second input element and responsive to this movement, means mounting the pilot operated stick for lateral movement and the stick being connected with the third input element and responsive to this movement, foot operated means mounted for movement and connected with the fourth input element, and output connecting means between each output element of the pitch operating mechanism and the blades of its rotor.

21. A convertiplane as in claim 20 in which the wing means includes a pair of laterally spaced flaps pivotally mounted on each wing means, and flap opearting mechanism for each flap connected between the fuselage and its flap to depress the latter with respect to the wing means upon transition of the wing means between generally horizontal position and generally vertical position.

22. A convertiplane as in claim 21 in which the flap operating mechanism is cam means including a cam carried by one of the parts including the fuselage and the wing means and a cam follower carried by the other part.

23. A convertiplane as in claim 22 in which the mounting means for the wing means includes an axle secured to the fuselage and extending into the wing means, and the flap operating mechanism includes a cam carried by the axle, a cam follower engaging the cam, and means connecting the cam follower with the flap.

24. A convertiplane as in claim 21 in which the flap depressing mechanism includes flap depressing means for each flap, including interconnecting means between each output connecting means and its flap depressing means to depress its respective flap when the pitch of the blades of its rotor is increased and to raise its flap when the pitch of the blades of its rotor is decreased.

25. A convertiplane as in claim 24 in which the interconnecting means includes an interconnecting lever having a mid-point connected with the flap and an end pivot at each end, the flap operating mechanism being connected with an end pivot, and the blade pitch connecting means being connected with the other end pivot.

26. A convertiplane as in claim 24 in which the flap depressing means includes a cam carried by one of the parts including the fuselage and the wing means, and a cam follower carried by the other part and engaging the cam.

27. A convertiplane comprising a fuselage, a pair of wing means carried by the fuselage in spaced fore and aft position, each wing means including at least one wing and each wing having a leading edge and a chord, mounting means carried by the fuselage and mounting each wing means for pivotal movement to and from a generally horizontal position and a generally vertical position, a pair of laterally spaced flaps for each wing means, means pivotally mounting each flap on its wing means, flap depressing mechanism carried by the fuselage and connected with each flap to depress the flaps upon pivoting of the wing means between its generally horizontal position and its generally vertical position, pilot operated means connected with the wing means to pivot the same, a pair of rotors carried by each wing means in laterally spaced relation, rotor mounting means mounting each rotor for rotation on the wing means on an axis through or adjacent to the chord of the wing means and ahead of the leading edge thereof, each rotor having blades, means mounting the blades for pitch change; pitch operating mechanism having four output elements one for the blades of each rotor to change the pitch thereof and having a first input element for operating all output elements in the same direction, a second input element for differentially operating the output elements for the fore pair and aft pair of rotors, and a third input element differentially operating the output elements for the side pairs of rotors; means to operate the first input element, a pilot operated stick, means mounting the stick for fore and aft movement and the stick being connected with the second input element and responsive to this movement, means mounting the pilot operated stick for lateral movement and the stick being connected with the third input element and responsive to this movement, foot operated means mounted for movement and controlling the fourth input element; and output connecting means between each output element of the pitch operating mechanism and the blades of its rotor.

28. A convertiplane as in claim 27 in which the flap depressing mechanism includes a flap depressing means for each flap.

29. A convertiplane as in claim 28 in which the mounting means for the wing means includes an axle secured to the fuselage and extending into the wing means, and the flap depressing means including a cam carried by one of the parts including the axle, and the wing means, and a cam follower carried by the other part and engaging the cam.

30. A convertiplane as in claim 28 including interconnecting means between each output connecting means and its flap depressing means to depress its respective flap with the wing means in horizontal position when the pitch of the blades of the rotor is increased and to raise the flap when the pitch of the blades is decreased.

31. A convertiplane as in claim 30 in which the interconnecting means includes an interconnecting lever having a midpoint connected with the flap and an end pivot at each end, the flap depressing means being connected with one end pivot, and the output connecting means being connected with the other end pivot.

32. A convertiplane as in claim 31 in which the flap depressing means includes a cam carried by one of the parts including the fuselage and the wing means and a cam follower carried by the other part, the cam having a form to position the flap in alignment with the wing means in generally horizontal and in generally vertical position of the wing means and to depress the flap between these positions.

33. A convertiplane as in claim 27 including a pitch change connection between the wing operating means and the first input element to change the pitch of the blades of all of the rotors in the same direction.

34. A convertiplane as in claim 33 including auxiliary means in the pitch change connection to operate the same independently of the wing operating means.

35. A convertiplane comprising a fuselage, a pair of wing means carried by the fuselage in spaced fore and aft position, each wing means including at least one wing and each wing having a leading edge and a chord, mounting means carried by the fuselage and mounting each wing means for pivotal movement to and from a generally horizontal position and a generally vertical position including wing connecting means between the wing means constructed such that the fore wing means pivots through an angle greater than 90° and the aft wing means pivots through an angle of less than 90° in pivoting to generally vertical position, wing operating means connected with the wing means to pivot the same, a pair of rotors carried by each wing means in laterally spaced relation and having blades, rotor mounting means mounting each rotor for rotation on the wing means on an axis through or approximately through the chord of the wing means and ahead of the leading edge thereof, means mounting the blades for pitch change; pitch operating mechanism having output means including four output elements one for the blades of each of the rotors to change the pitch of the blades thereof, the pitch operating mechanism having input means including a first input element for operating all output elements in the same direction, a second input element for differentially operating the output elements for the fore and aft pair of rotors, a third input element differentially operating the output elements for the side pairs of rotors, and a fourth input element differentially operating the output elements for the cross pairs of rotors; means connected with the first input element to operate the same, a pilot operated stick, means mounting the stick for fore and aft movement and the stick being connected with the second input element and responsive to this movement, means mounting the pilot operated stick for lateral movement and the stick being connected with the third input element and responsive to this movement, foot operated means mounted for movement and connected with the fourth input element, and output connecting means between each output element of the pitch operating mechanism and the blades of its rotor.

36. A convertiplane as in claim 35 in which the connecting means between fore and aft wing means includes adjusting means to vary the pivotal angular relationship thereof.

37. A convertiplane as in claim 35 in which the connecting means between the fore and aft wing means includes arm means connected with the fore wing means, arm means connected with the aft wing means and having a length greater than the arm means for the fore wing means, and a link connecting the two arm means.

38. A convertiplane as in claim 37 in which the connecting link includes an adjusting means to lengthen or shorten the link.

39. A convertiplane as in claim 35 in which the means to operate the first input element is adjustable auxiliary pitch change means connected with the fuselage.

40. A convertiplane as in claim 35 in which the means to operate the first input element is a connection with the wing operating means.

41. A convertiplane as in claim 40 in which the connection with the wing operating means includes adjustable auxiliary pitch change means to change the length of the connection.

42. A convertiplane as in claim 35 including a pair of laterally spaced flaps pivotally mounted on the wing means, and a connection between each output connecting means and its flap to raise the flap for a decrease in blade pitch of its adjacent rotor and depress the flap for an increase in blade pitch of its adjacent rotor.

43. A convertiplane as in claim 35 including a pair of laterally spaced flaps pivotally mounted on each wing means, and flap depressing mechanism carried by the fuselage and the wing means and connected with the flaps to depress them between transition of the wing means between generally vertical and generally horizontal position.

44. A convertiplane as in claim 43 in which the flap depressing mechanism includes a flap depressing means for each flap, including an interconnecting means between each output connecting means and its flap depressing means to raise the flaps on a decrease in blade pitch and to depress the flaps upon an increase in blade pitch.

45. A convertiplane as in claim 35 in which the means to operate the first input element is a connection with the wing operating means, including a pair of laterally spaced flaps pivotally mounted on each wing means, and flap depressing means carried by the fuselage and the wing means and connected with the flaps to depress the flaps in the transition between generally horizontal position and generally vertical position.

46. A convertiplane as in claim 35 in which the means to operate the first input element is a connection with the wing operating means, including a pair of laterally spaced flaps pivotally mounted on each wing means, and an interconnecting means between each output connecting means and its related flap to depress the flap upon an increase in pitch of the blades of the rotor and to raise the flap upon a decrease in the pitch of the blades of the rotor.

47. A convertiplane as in claim 46 including flap depressing mechanism carried by the fuselage and the wing means and connected with the interconnecting means to depress flaps upon transition of the wing means between a generally horizontal position and generally vertical position.

48. A convertiplane as in claim 46 in which the flap depressing mechanism includes a cam carried by one of the parts including the fuselage and the wing means and a cam follower carried by the other part, and the cam having arcuate terminal ends.

49. A convertiplane as in claim 47 including auxiliary pitch change means in the connection between the wing operating means and the first input element.

50. A convertiplane as in claim 47 in which the interconnecting means includes an interconnecting lever, a pivot pivotally mounting the lever on the wing means, the interconnecting lever having an airplane mode position and a helicopter mode position, the output connecting means having a link extending axially of the wing means and connected with the interconnecting lever at or approximately at right angles to the pivot when in helicopter mode position and removed therefrom in airplane mode position, and the flap depressing means including a link extending at right angles to the axis of the wing means and connected with the connecting lever at or approximately at right angles to the pivot when in airplane mode position and removed therefrom in helicopter mode position.

51. A convertiplane comprising a fuselage, a pair of wing means carried by the fuselage in spaced fore and aft position, each wing means including at least one wing and each wing having a leading edge and a chord, a pair of rotors carried by each wing means in laterally spaced relation and each rotor having blades, pivotal mounting means mounting the rotors for pivotal movement to and from a generally horizontal position and a generally vertical position, operated means connected with the rotors to pivot the same, rotor mounting means mounting each rotor for rotation on the pivotal mounting means, means mounting the blades for pitch change; pitch operating mechanism having four output means and having input means for collective and differential operation of the output means and collective and differential pitch change of the blades; means connected with the input means to operate the latter, output connecting means between the output means and the blades of the rotors, flaps pivotally mounted on the wing means, and flap depressing mechanism operable by pivoting of the rotors and connected with the flaps to depress the same in the transition of the rotors between horizontal and vertical positions.

52. A convertiplane comprising a fuselage, wing means carried by the fuselage having a leading edge and a chord, mounting means carried by the fuselage and mounting the wing means for pivotal movement to and from a generally horizontal position and a generally vertical position, wing operated means connected with the wing means to pivot the same, rotor means including at least a pair of rotors carried by the wing means in laterally spaced relation and each rotor having blades, rotor mounting means mounting each rotor for rotation on the wing means on an axis through or adjacent to the chord of the wing means and ahead of the leading edge thereof, means mounting the blades for pitch change; pitch operation mechanism having output means for each rotor and having input means for collective and differential operation of the output means and collective and differential pitch change of the blades; means connected with the input means to operate the latter, output connecting means between each output means and the blades of its rotor, flaps pivotally mounted on the wing means and laterally spaced from each other, and flap depressing mechanism carried by the wing means and the fuselage operable by pivoting of the wing means and connected with the flaps to depress the same in the transition of the wing means between horizontal and vertical positions.

References Cited by the Examiner

UNITED STATES PATENTS

| | | | |
|---|---|---|---|
| 1,846,992 | 2/32 | Decker | 244—7 |
| 1,891,166 | 12/32 | Leupold | 244—7 |
| 2,478,847 | 8/49 | Stuart | 244—7 |
| 2,702,172 | 2/55 | Focke | 244—48 |
| 2,708,081 | 5/55 | Dobson | 244—7 |
| 2,814,451 | 11/57 | Turner et al. | 244—7 |
| 2,835,456 | 5/58 | Kaplan | 244—7 |
| 3,029,043 | 4/62 | Churchill | 244—7 |

FERGUS S. MIDDLETON, *Primary Examiner.*

MILTON BUCHLER, *Examiner.*